July 30, 1935.　　　F. REMLINGER　　　2,009,635
ANIMAL TRAP
Filed April 18, 1934
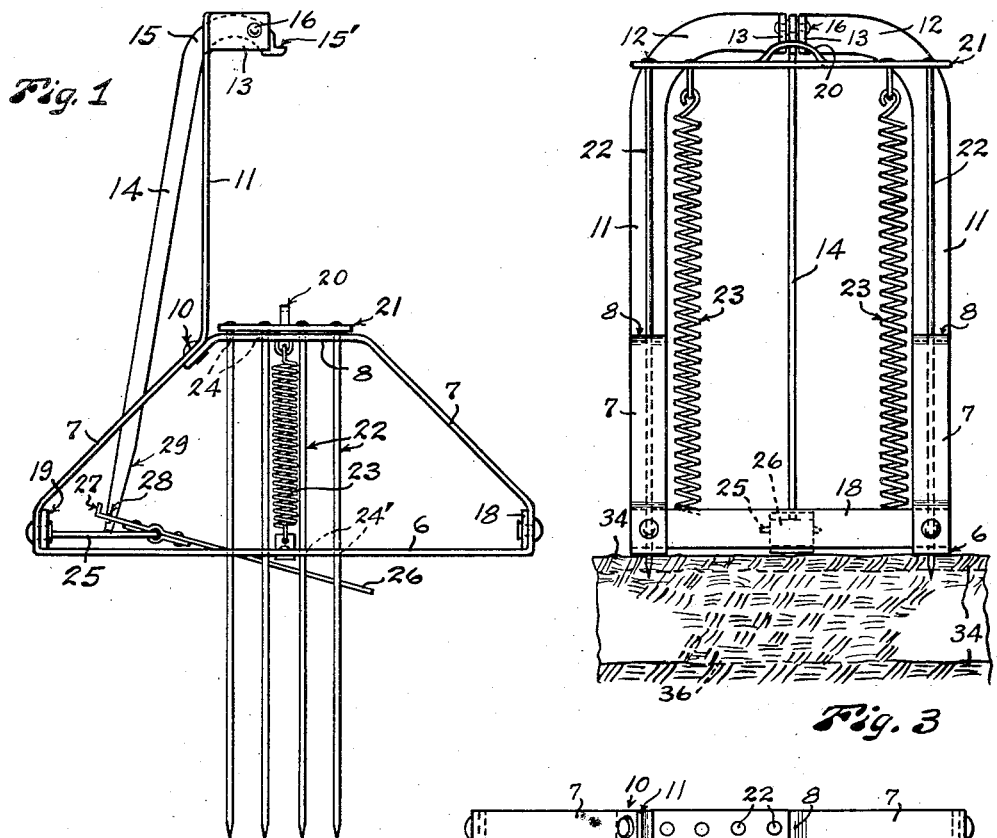
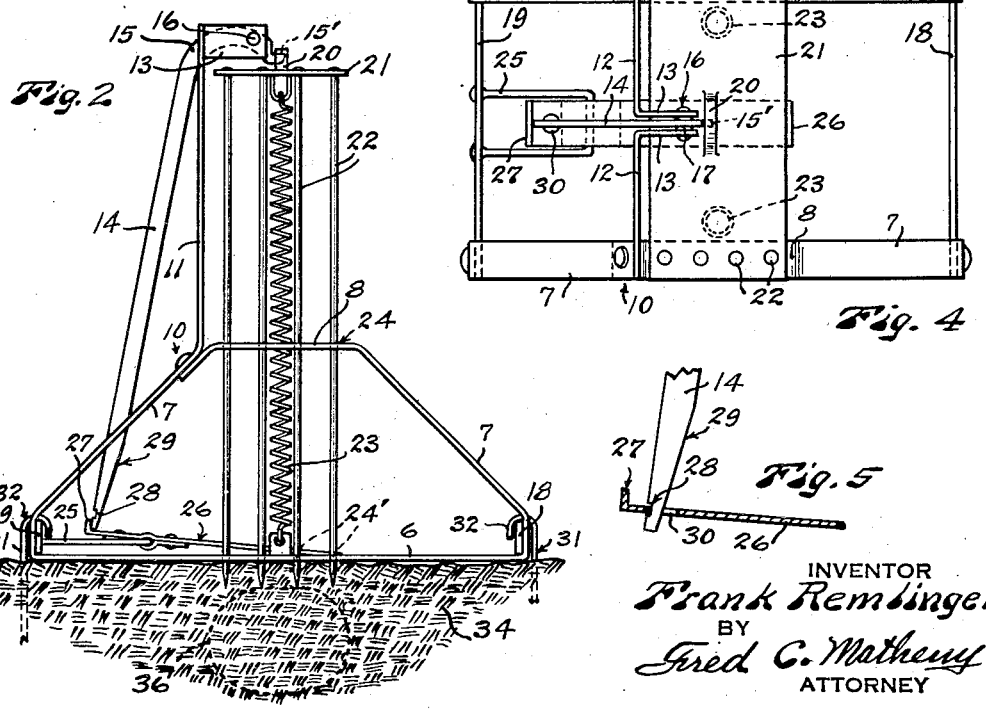
INVENTOR
Frank Remlinger
BY
Fred C. Matheny
ATTORNEY Patented July 30, 1935

2,009,635

UNITED STATES PATENT OFFICE 2,009,635

ANIMAL TRAP

Frank Remlinger, Kirkland, Wash.

Application April 18, 1934, Serial No. 721,170

4 Claims. (Cl. 43—79)

My invention relates to animal trap of the type adapted for catching moles and like animals which burrow under ground and the general object of my invention is to provide a trap which is adapted to be placed on the ground over an underground tunnel or runway along or through which animals pass and set in such a manner that an animal passing along the underground tunnel or runway will trip the trap and be impaled and caught thereby.

The trap is herein described and illustrated as adapted for catching moles but it will be understood that it may be used in trapping other burrowing animals.

Another object of the invention is to provide a trap of this nature embodying a main frame forming a support and mounting for a spring driven movable impaling means, said main frame affording a two point bearing for the impaling spikes whereby they are efficiently guided and supported in such a manner as to prevent bending of the spikes and to prevent binding of said spikes in operation and to further contribute to the production of a strong and efficient trap which is light in weight and easy to handle.

Other objects are to provide a mole trap of strong, simple and compact construction, which is not expensive to manufacture, which is efficient in operation and which is easy to set and handle.

Another object of the invention is to provide safety means in connection with the trip mechanism whereby the trap may be retained in a set position without danger of being accidentally tripped.

Other and more specific objects of the invention will be apparent from the following description taken in connection with the accompanying drawing.

In the drawing Figure 1 is a side elevation of a trap constructed in accordance with my invention as said trap may appear before being set.

Fig. 2 is a side elevation showing the trap set for catching moles.

Fig. 3 is a front elevation of the trap with the parts in a set position.

Fig. 4 is a plan view looking down onto the top of the trap.

Fig. 5 is a fragmentary detached view partly in section of a portion of the trip mechanism.

Like reference numerals designate like parts throughout the several views.

Referring to the drawing I show a trap embodying a main frame formed of two side frame members of duplicate construction rigidly secured together in spaced apart relation.

Each side frame member is preferably made from a single piece of strap iron or like metal bent to form a longer base bar 6, two inclined or convergent side bar portions 7 and a shorter top bar 8. This top bar 8 is parallel with the base bar 6 and substantially shorter than said base bar. In this way a side frame member shaped somewhat like a triangle with a flattened apex is formed. At a location adjacent one end of each top bar 8 two portions of one of the inclined side bars 7 are overlapped and riveted or otherwise secured together as indicated at 10 and the outermost one of these overlapped portions is extended upwardly as at 11 and thence bent inwardly as at 12 and thence bent forwardly as at 13. The two portions 11—12 and 13 which extend upwardly from the respective side frames of the trap cooperate to form an arch like support for a set lever 14. The curved upper end 15 of the set lever 14 is pivotally mounted on a rivet or bolt 16 which rigidly secures the two portions 13 of the arch like frame members together. A bushing 17 may be provided on the rivet 16 to prevent binding of the portions 13 against the set lever 14. The portions 11—12—13 serve as means for firmly attaching the upper portions of the main side frames and the lower portions of said side frames are rigidly secured together by cross bars 18 and 19 thereby completing a strong and substantial frame structure.

A shelf like portion 15' is provided on the upper forward end of the set lever 14 for engagement with a loop 20 which is rigidly connected with a plate member 21. A plurality of parallel impaling members or spikes 22 are securely anchored in each end of the plate member 21 and extend downwardly through holes 24 in the top frame bars 8 and holes 24' in the bottom frame bars 6 whereby said impaling members 22 are supported and guided for vertical movement. Two helical tension springs 23 have their lower ends connected with the side frame bars 6 and their upper ends connected with plate 21 whereby they will exert a downward pull on the plate 21.

A bracket member 25 of substantially U shape is rigidly secured to the cross bar 19 and forms a fulcrum on which a trip or trigger member 26 is pivotally mounted. One end of the trigger member 26 is adapted to rest upon the ground substantially midway between the two sets of impaling members and approximately in the plane of the base of the trap and the other end of said trigger member is provided with a short, upwardly extending lug 27 for engagement with the lower end of the trip lever 14. The trip lever 14 also preferably has a notch 28 in the rear edge thereof adjacent the lower end and said lever may be tapered off on the front side as at 29 whereby the lower end of said trip lever may protrude into a hole 30 in the trigger member to allow the notch 28 to be engaged with said trigger member as shown in Fig. 5. This constitutes a valuable safety feature when the trap is to be handled while in a set condition, as it is not easy to trip the trap accidently when the trigger member 26 is engaged within the notch 28.

Separate stake members 31 with hook portions 32 on the upper ends thereof are adapted to be driven into the ground to anchor the trap in a fixed position when it is set.

It will be noted that the frame members 11 are positioned edgewise as respects the planes of the side frames 6—7—8 of the trap. For this reason they form a strong and substantial truss or connection across the top of the trap between the two side frames. It will also be noted that the trip lever is shaped and fulcrumed so that the portion 15' will release the loop member 20 quickly and without too much angular movement of the trip lever.

The two point bearing for the impaling members 22 formed in the respective frame bars 6 and 8 is an important feature of the invention as it adds to the strength and smoothness of operation of the trap, prevents binding of the impaling members and makes possible the use of impaling members of smaller diameter.

When this trap is sprung or in a non-set condition the plate 21 will rest upon the top frame bars 8, the tension springs 23 will be contracted as shown in Fig. 1, but the notch 28 in the trip lever 14, which, in Fig. 1, is shown engaged with the trigger 26 need not be in this position as both the trip lever and the trigger may be free to hang vertically or assume any other position.

To set the trap the plate 21 and impaling members 22 are raised in the frame until the plate 21 is adjacent the frame parts 13. The trip lever 14 is swung outwardly, that is to the left from the position shown in Fig. 1, far enough so that the tip of the flat portion 15' will first clear the loop member 20 and then engage underneath said loop member 20, as the trip lever is again swung inwardly toward the trap. When thus engaged, the trip lever will hold the plate 21 and impaling members 20 in elevated position with the springs 23 extended and under tension. After the portion 15' has been properly engaged with the loop member 20 the end of the trip lever 14 may be engaged back of the lug 27 on the trigger 26 and the impaling members will be retained in an elevated position until this trip lever is released, as by lifting the outer end of the trigger member 26, whereupon the impaling members will be released and forcibly snapped down by the springs 23. If the trap is to be handled while the impaling members are in set position the trigger member 26 is preferably engaged within the notch 28 and accidental springing of the trap thereby prevented. When this has been done it is necessary to release the trigger 26 from engagement within the notch 28 and engage the end of the trip lever with the lug 14 before the trap is left in a final set position for the catching of moles or other animals.

It is characteristic of moles to make burrows or runways underneath and substantially parallel to the surface of the ground along which they move in search of worms and like food. In damp weather these runways are made close to the surface. It is also characteristic of moles that they will proceed to re-open these runways if the soil is pressed down and the runways obstructed. However if any foreign substance, especially metal, is placed in the runway the moles becomes suspicious and often will not attempt to re-open the runway or pass the foreign substance. The presence of this trap over the runway does not deter the mole from opening up the runway as no metal parts extend into the runway.

In setting the trap for moles it is preferable to press the soil down into the runway and obstruct the runway at the location where the trap is set. In Fig. 2 the soil is indicated by 34 and the outline of the obstructed runway which passes under the trap is indicated by dotted lines 36.

When the trap is put in place and after the earth has been pressed into the runway it is preferable to press the impaling members into the ground to be certain that no obstructing objects as stones are in their way, after they may be secured in elevated position with the end of the trip lever 14 engaged with lug 27 and the trigger member resting on, or in close proximity to, the ground at the location where the runway has been obstructed. The trap is necessarily anchored by stakes 31. When a mole attempts to re-open that portion of the runway which passes under the trap the end of the trigger which rests on the ground will be raised, the trap tripped and the mole impaled by the descending spikes 22.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In a trap of the class described; a main frame embodying two transversely spaced apart side frame members; means rigidly connecting said two side frame members; a pair of vertically spaced apart bearing members on each of said side frame members; vertically aligned guide holes in each of said pairs of vertically spaced apart bearing members; two sets of impaling members guided for vertical movement in said guide holes; transverse plate means rigidly connected with the upper ends of all of said impaling members; springs connected with said plate means urging said impaling members downwardly; an upright frame extending above said plate means; a trip arm pivoted on the upper portion of said upright frame and adapted to releasably engage with said plate; said trip arm extending downwardly to the lower portion of said trap frame; and trigger means having one portion adapted to releasably engage with said trip arm and another portion adapted to rest on the ground between said two sets of impaling members.

2. In a trap of the class described; a main frame comprising two spaced apart side members each having a relatively long base bar portion and a shorter top bar portion parallel to said base bar portion and inclined end portions connecting said top bar portion and said base bar portion and top bar portions and said base bar portions having aligned bearing holes therein; rigid cross bars positioned at the ends of said base bar portions and connecting said two side frame members; a plurality of impaling members slidably guided in said bearing members; a plate to which the upper ends of all of said impaling members are secured; springs connecting said plate with said frame members and exerting a downward pull on the plate; upright frame members extending upwardly from said side frame members at the side of said plate and meeting at a point above said plate; a trip lever extending from the base portion of the trap upwardly and releasably engaging said plate in the uppermost position of the plate; and trigger means at the base of the trap releasably holding said trip lever.

3. In a trap of the class described; a main frame comprising two spaced apart one piece side members each having a relatively long base bar portion and a shorter top bar portion parallel to said base bar portion and inclined end portions connecting said top bar portion and said base bar portion, said top bar portions and said base bar portions having aligned bearing holes therein; rigid cross bars positioned at the ends of said base bar portions and connecting said two one piece side frame members; a plurality of impaling members slidably guided in said bearing members; a plate to which the upper ends of all of said impaling members are secured; tension springs connecting said plate with said frame members and exerting a downward pull on the plate; integral upright frame members extending upwardly from said side frame members at one side of said plate and curved at their upper ends and meeting at a point above said plate; a loop member on said plate; a lever pivoted to the upper ends of said upright frame members; means on said lever adapted to engage with said loop member to hold the trap in set position; and a trigger pivoted on the frame, one end of said trigger being adapted to lie on the ground between said two sets of spikes and the other end being adapted to engage with and releasably hold said lever.

4. In a trap of the class described; a pivoted trip arm, having a notch in one edge near one end thereof; and a pivoted trigger member having a lug adapted to engage with said trip arm and readily releasable therefrom; said trigger member having an opening therein for the reception of the end of said trip arm, whereby said notch in said trip arm may securely engage with said trigger member and accidental tripping of said trap may be prevented.

FRANK REMLINGER.